Oct. 4, 1966 S. A. YEFSKY 3,276,708

APPARATUS FOR AND METHOD OF LOADING CARTRIDGE

Filed March 2, 1964 3 Sheets-Sheet 1

INVENTOR.
SHELDON ARTHUR YEFSKY
BY
Hume, Groen, Clement & Hume
ATTYS.

INVENTOR.
SHELDON ARTHUR YEFSKY
BY
Hume, Groen, Clement & Hume
ATTYS

APPARATUS FOR AND METHOD OF LOADING CARTRIDGE

Filed March 2, 1964 3 Sheets-Sheet 3

INVENTOR.

SHELDON ARTHUR YEFSKY

BY

Dume, Groen, Clement & Dume

ATTYS.

United States Patent Office 3,276,708

Patented Oct. 4, 1966

3,276,708

APPARATUS FOR AND METHOD OF LOADING CARTRIDGE

Sheldon Arthur Yefsky, Skokie, Ill., assignor to Cook Electric Company, Morton Grove, Ill., a corporation of Delaware Filed Mar. 2, 1964, Ser. No. 348,510

6 Claims. (Cl. 242—55.13)

The present invention relates to an apparatus for and method of loading a cartridge with a recordable medium.

It is an object of the present invention to provide a new and improved apparatus for and method of loading a cartridge with a recordable medium.

It is another object of the present invention to provide a new and improved apparatus for and method of winding a recordable medium onto a cartridge.

It is still another object of the present invention to wind a recordable medium onto a cartridge by supplying the medium to the cartridge at a substantially constant velocity, while rotating the cartridge reel at a substantially constant torque.

It is a further object of the present invention to wind a cartridge with a recordable medium so that the tension of progressive convolutions uniformly decreases.

It is a further object of the present invention to provide a method of winding a recordable medium onto a cartridge, forming the medium into an endless loop, and passing the endless loop medium through the cartridge to condition the cartridge for its subsequent usage.

It is a further object of the present invention to provide a new and improved apparatus for and method of exercising a recordable medium that has been wound onto a cartridge.

It is still another object of the present invention to load a recordable medium on a cartridge, form the medium into a closed loop, and run the medium through the cartridge to redistribute the tension of the medium in the cartridge to that approximating the tension which the medium maintains during subsequent usage.

The above and other objects are realized in accordance with the present invention by providing an apparatus for and method of loading a cartridge with a recordable medium. The medium is wound onto the cartridge, formed into an endless loop, and run through the cartridge for a predetermined period of time. More specifically, the recordable medium is supplied to and wound about a cartridge at a substantially constant speed, while the cartridge is rotated at a substantially constant torque. As a result, the tension of the progressively larger convolutions of the recordable medium is progressively less than the innermost convolutions, or, expressed in another way, the tension of each convolution is inversely proportioned to the diameter of the convolution. When a desired length of the medium is wound on the cartridge, the ends of the medium are spliced or joined, to form the medium into a continuous or endless loop. The medium is then run through, withdrawn from, and returned to the cartridge to redistribute the tension of the endless loop medium. Finally, the cartridge is adjusted to obtain the desired pack tension to assure complete attitude insensitivity of the cartridge during operation.

The invention, both as to its organization and method of operation, taken with further objects and advantages thereof, will best be understood by reference to the following description taken in connection with the accompanying drawings, in which.

Figure 1:
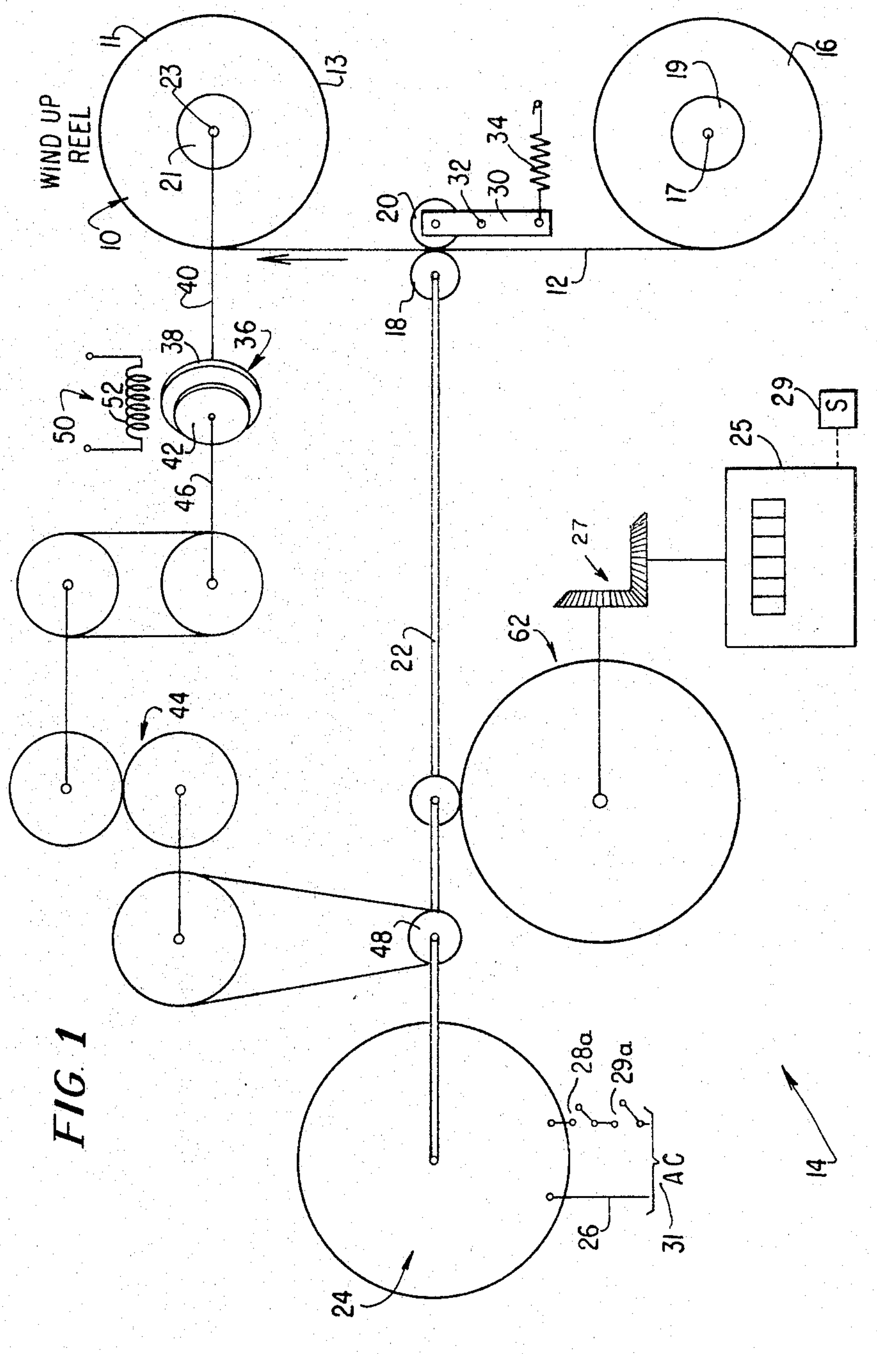
FIG. 1 is a diagrammatic view of a winder mechanism, embodying the principles of the present invention, used in loading a cartridge with a recordable medium.

Referring now to the drawings, there is illustrated in FIGS. 1 through 6 an apparatus for and method of loading a cartridge with a recordable medium. The cartridge may be, for example, of the type described and claimed in the copending Yefsky application Serial No. 231,972, now abandoned, while the recordable medium, for example, may comprise a magnetic tape having a width, for example, of ¼″. Briefly, the cartridge comprises a casing embodying a disc-like wall and peripheral skirt, providing a chamber for receiving a tape coil or pack wound about a spool having an integral hub. The hub is rotatably supported from the casing in such a fashion that the tape pack engages the spool and the disc-like wall of the casing. The pack tension, i.e., the relative resistance offered to the pack by the disc-like wall of the casing, is controlled by a suitable tensioning arrangement.

In accordance with the present invention, a predetermined length of a recordable medium, for example magnetic tape 12, is wound on the spool 11 of the cartridge 10 by a winder mechanism generally identified by reference numeral 14 and illustrated in FIG. 1. After a predetermined length of the magnetic tape has been wound on the spool 11 of the cartridge 10, the spool is inserted into the skirted casing of the cartridge 10 and the tensioning arrangement suitably adjusted to maintain the spool 11 and casing 12 of the cartridge 10 in assembled relation. Next, the magnetic tape is formed into a continuous, endless loop. Thereafter, the magnetic tape is removed from, returned to, and passed through the cartridge 10 by an exerciser mechanism 15 illustrated in FIGS. 4 through 6. After the exercising operation is completed, the tension of the convolutions of the magnetic tape more closely approximates the tension of the convolutions during actual usage of the cartridge. Thus, it will be appreciated that the loading of the cartridge 10 with the magnetic tape 12 comprises basically both the winding operation, controlled by the winder mechanism 14, and the exercising operation, controlled by the exerciser mechanism 15.

Considering now more specifically the winding operation, i.e., the winding of the magnetic tape 12 on the spool 11 of the cartridge 10, attention is invited to FIG. 1 wherein the winder mechanism 14 is depicted in diagrammatic form. Briefly, a large quantity or supply of the magnetic tape is stored on a supply reel 16. This supply reel 16 is suitably supported on a rotatable shaft which has a drag clutch (not shown) mounted to a frame (not shown). The magnetic tape 12 is unwound from the supply reel 16 against the tension caused by the drag clutch by a capstan 18 and associated idler 20, also suitably supported from the frame (not shown). The capstan 18 and idler 20 may be of the type described and claimed in application Serial No. 233,060, filed by Arthur Yefsky on October 25, 1962, and assigned to the same asignee as the present application. The capstan is directly driven by a constant speed synchronous motor 24 so that the speed of the magnetic tape 12 is directly controlled by the motor 24. From the capstan 18 and idler 20, the magnetic tape 12 passes to the spool 11 of the cartridge 10 which is suitably secured to a wind-up reel 13. The wind-up reel 13 is driven indirectly by the motor 24 through a magnetic clutch 36, with the result that the spool 11 is driven at a constant torque, as determined by the magnetic clutch 36.

More precisely, the supply reel 16 is detachably secured to a shaft 17 suitably journaled on the frame (not shown). The shaft 17 embodies a threaded end to accommodate a nut 19 that retains the supply reel 16 on the shaft 17. Although not illustrated, a suitably braking or dragging arrangement is embodied in the shaft 17 to prevent the supply reel 16 from overrunning the magnetic tape during operation of the capstan 18 and after the capstan 18 is stopped.

In any event, the magnetic tape is maintained in substantially taut condition between the supply reel 16 and the capstan 18 by the drag clutch (not shown). The capstan 18 is suitably journaled on the frame (not shown) and is directly driven by the shaft 22 of the motor 24. As illustrated, a counter 25 is also driven by the motor shaft 22 through a gearing arrangement 27. The motor 24 is energized under the control of a circuit 26 which embodies suitable contacts **28*a* and 29*a*, described hereinbelow. By suitably adjusting the control circuit 26 the speed of the motor 24 and capstan 18 is changed in order to drive the magnetic tape 12** at a desired speed.

The idler 20 is rotatably mounted on the end of an arm 30 that is pivoted about a post 32 suitably supported from the frame (not shown). The end of the arm 30 is connected to a coil spring 34 so as to said the idler 20 to the capstan 18. Hence, as the magnetic tape 12 passes between the capstan 18 and idler 20, the magnetic tape is continuously biased into engagement with the capstan 18. Inasmuch as the capstan 18 is driven at a constant speed and, in this sense is an isolation-type capstan, the capstan applies a constant high torque to the magnetic tape 12 so as to move the tape at a constant velocity, for example 15″ per second.

With the free end of the magnetic tape extending beyond the capstan 18 and idler 20, it is manually wound about the spool 11 which is detachably connected to a wind-up reel 13 by a nut 21. The nut 21 threadedly engages a shaft 23 that is suitably journaled in the frame (not shown) and, further, that supports the wind-up reel. To assure that the free end of the magnetic tape can be used to form an endless, continuous loop, the end is slightly displaced from the hub of the spool 11, whereupon the spool 11 is turned manually several times to wind several convolutions on the spool 11. Thereafter, the nut 21 is adjusted to secure the spool 11 to the wind-up reel 13.

As previously described, the wind-up reel 13 is rotated under the control of the magnetic clutch 36. The magnetic clutch 36 comprises no part of the present invention and can comprise any well-known clutch. It embodies a driven element 38 which is magnetically coupled to a driving element 42, the magentic coupling being determined by a control circuit 50 illustrated in detail in FIG. 2. However, as shown in FIG. 1, the driving element 38 is drivingly connected to the wind-up reel 13 by a shaft 40 while the driving element 42 is drivingly connected by a shaft 46 to a torque transmission arrangement 44. The transmission arrangement 44, in turn, drivingly interconnects the shaft 46 with a pulley 48 mounted on the motor shaft 22. Hence, in contrast to the capstan that is directly connected to the motor 24 by the motor shaft 22, the wind-up reel 13 is directly connected to the motor shaft 22 by the transmission arrangement 44 and magnetic clutch 36.

Figures 2, 4, 6:
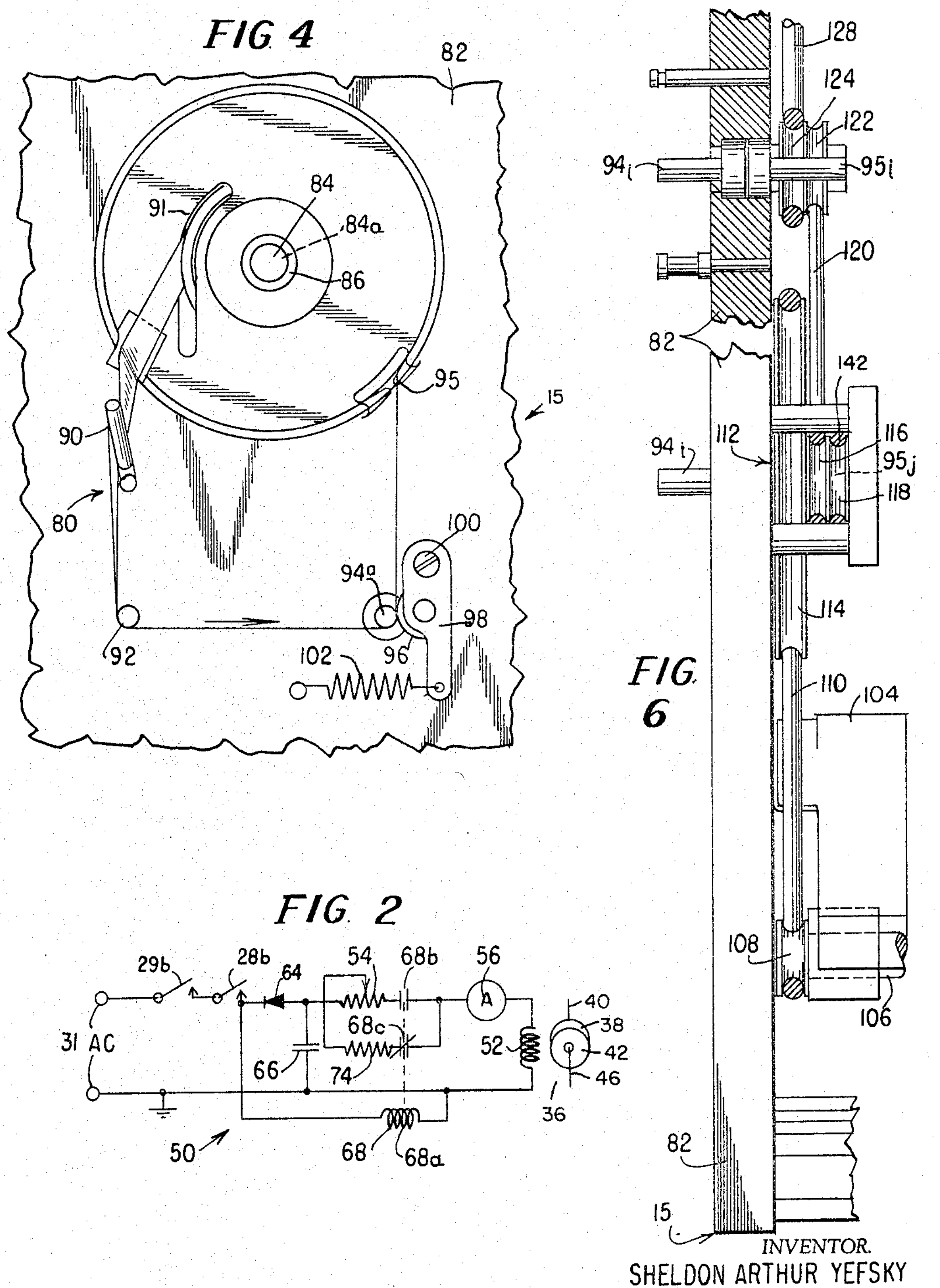
FIG. 2 is a schematic view of a control circuit for a magnetic clutch embodied in the mechanism of FIG. 1.
FIG. 4 is a fragmentary top plan view of the exerciser mechanism of FIG. 3.
FIG. 6 is an enlarged, fragmentary, end elevational view, shown partially in section, of the exerciser mechanism of FIG. 4.

Considering now the magnetic clutch control circuit 50, attention is invited specifically to FIG. 2.

Briefly, different degrees of coupling are provided by the magnetic clutch 36 by setting a potentiometer 54 at different positions. The different positions of the potentiometer cause different levels of current to flow through a winding 52 that generates a magnetic coupling between the driven element 38 and driving element 42. The degree of coupling between the elements 42 and 38 is visually monitored by an ammeter 56 which is serially connected to the winding 52. With the potentiometer 54 set at a predetermined position, the wind-up reel 13 is driven at a predetermined constant torque. Thus, irrespective of the speed or torque generated by the motor 24, the transmission arrangement 44 or the driving element 42, the wind-up reel 13 is driven at a constant torque as determined by the potentiometer 54. On the other hand, the speed of the reel 13 is a function of the instantaneous diameter of the wound-up tape.

Assuming that the starting switch 28 is closed and a switch 29 controlled by the counted 25 is closed, the contacts **28*a* and 29*a* in the motor circuit 26 are closed. In addition, contacts 28*b* and 29*b* in the clutch control circuit 50 are also closed. As a result, first A.C. voltage from the A.C. source 31 is rectified by a diode 64 and smoothed by the energy storage property of the grounded condenser 66 to provide a D.C. voltage to be applied to the winding 52 of the clutch 36. Secondly, a time delay relay 68 having a winding 68*a* is energized to close normally open contacts 68*b*, serially connected with the potentiometer 54, and to open normally closed contact 68*c* shunted across the potentiometer 54 and contact 68*b*. By the use of the slow-to-operate relay and its associated parallel contacts 68*b* and 68*c*, maximum torque is applied to the wind-up reel to overcome the inherent inertia of the wind-up reel and associated structure. Hence, within a relatively short time (e.g. one second), the winder mechanism 14 is operating at its desired level. Specificially, when the contacts 28*b* and 29*b* are closed, the D.C. voltage across the grounded condenser 66 produces a D.C. current. This current does not flow through the potentiometer 54, which, in the normal operation of the winder mechanism 14, is set at a relatively high value, because the normally open contacts 68*b* are still opened. However, the D.C. current does flow through a resistor 74, having a relatively low value, and the serially connected contacts 68*c*, the ammeter 56, and the winding 52, thereby to energize the winding 52 and establish magnetic coupling between the elements 38 and 42. Because the resistor 74 has a relatively low resistance, substantially 100% of the D.C. current is supplied to the winding 52 with the result that the magnetic clutch 36 provides 100% coupling between the transmission unit 44 and the wind-up reel 13. Hence, the wind-up reel 13 is supplied with a relatively high torque to immediately bring the wind-up reel 13** up to operating speed.

After a predetermined time, the time delay relay 68 operates, thereby closing the normally open contact **68*b* to complete a circuit through the potentiometer 54 and opens the normally closed contact 68*c* to open the shunting circuit around the potentiometer 54. As a result, D.C. current flows through the potentiometer 54, the contact 68*b*, the ammeter 56, to the winding 52. Inasmuch as the potentiometer 54, irrespective of its setting, has a higher resistance value than the shunt resistor 74, the current supplied to the winding 52 is less than the current previously supplied. Accordingly, the degree of coupling between the transmisison unit 44 and the wind-up reel 13** rotates thereafter at a substantially constant torque, having a value less than previously described, throughout the balance of the winding operation.

From the foregoing description, it will be appreciated that during the normal winding operation, i.e., during the winding of the magnetic tape 12 around the spool 11 (1) the capstan 18 and associated idler 20 drive the magnetic tape 12 at a constant velocity, e.g., 15″ per second, (2) the wind-up reel 13 is rotated at a constant torque having a value determined by the magnetic clutch 36, and (3) as the tape is wound on the spool 11, the diameter of the pack increases: Thus, throughout the entire winding operation, the angular velocity of the wind-up reel 13 (and spool 11) uniformly decerases, for example, by a factor of almost two, because the tape speed is maintained at a constant value even though the diameter of the pack uniformly increases. Expressed in another way, with the tape speed constant, the tangential velocity of the spool 11 constant, and the diameter of the pack increasing, the angular velocity of the spool 11 must decrease. In addition, the tension of the convolutions as wound on the spool 11 also decreases by a factor of about two; expressed another way, the inner convolutions of the pack are wound more tightly than the outer convolutions. For example, the tension on the innermost convolutions is approximately 20 grams, while the tension on successive outermost convolutions progressively decreases, the tension on the outermost convolution being approximately 12 grams. Thus, during the winding operation, the successively found convolutions have progressively less tension so that, specifically, the tension in each convolution is inversely proportional to the diameter of the convolution. It is particularly significant that the tension throughout the pack uniformly changes, i.e., it decreases from the inner convolution to the outer convolution (for example, during winding) and increases from the outer convolution to the inner convolution.

Returning to the winding operation, per se, when a predetermined amount of the magnetic tape is delivered to the wind-up reel 13, as indicated specifically by the counter 25, the switch 29 is opened by the counter 25. The opening of the switch 29 causes its associated contacts 29*a* in the motor circuit 26 to open and its associated contacts 29*b* in the magnetic clutch circuit 50 to open. As a consequence, the motor 24 is de-energized so that the capstan 18 is no longer positively driven and, in addition, the magnetic clutch 36 is de-energized so that the wind-up reel 13 is no longer positively driven. Within a few seconds, the rotation of the supply reel 16 and the wind-up reel 13 is arrested, primarily because of the drag brake associated with the supply reel shaft 17.

When the movement of the magnetic tape has been arrested, it is cut by appropriate means, preferably between the capstan 18 and the wind-up reel 13. Thereafter, the nut 21 is removed from the shaft 23 and the spool 11 is removed from the wind-up reel 13. At this time, the spool 11 is inserted into the casing of the cartridge and the tensioning arrangement assembled to maintain the spool and the casing in assembled relation. Next, the casing of the cartridge is manually gripped and the inner end of the tape (attached to the innermost convolution around the core) is pulled approximately two feet. Next, the spool 11 and the casing of the cartridge are gripped and one or two of the outermost convolutions are unwound from the spool, instead of being pulled as the inner end was. The final step of the winding operation is to form the magnetic tape 12, wound on the cartridge 10, into an endless or continuous loop. In this connection, the inner and outer ends are suitably cut to mate with one another and the ends are thereafter spliced or welded by suitable means to form the endless or continuous loop. A visual check is made of the splice or weld and the compactness of the pack.

After the winding operation is completed, the magnetic tape on the cartridge is exercised, i.e., it is passed through, out of, and returned to the cartridge, by the exerciser mechanism 15, illustrated in FIGS. 3 through 6. As previously suggested, it is the objective of the exercising step to change the tension of each of the convolutions of the tape, to more accurately simulate the tension that the tape pack maintains during its final usage. Actually, immediately following the winding operation, the tape 12 has a particular coefficient of friction; however, during the exercising operation, this coefficient of friction changes because of the relative movement or slippage of the convolutions during passage of the tape into, through, and out of the cartridge 10. The exact movement of the convolutions and the magnetic tape is specifically disclosed in the above identified Yefsky application.

In one form of the exerciser 15, illustrated in FIGS. 3 through 6, it is designed to accommodate and exercise ten cartridges, disposed in two parallel rows each containing five cartridges. In this connection, ten separate cartridge arrangements are embodied in the exerciser mechanism 15, each of which functions to individually support a tape cartridge and, in addition, drive the external portion of the tape loop, identified generally by reference numeral 80. Hence, after a predetermined period of time, for example one hour, each part of the magnetic tape 12 will be passed through the cartridge 10.

Figure 5:
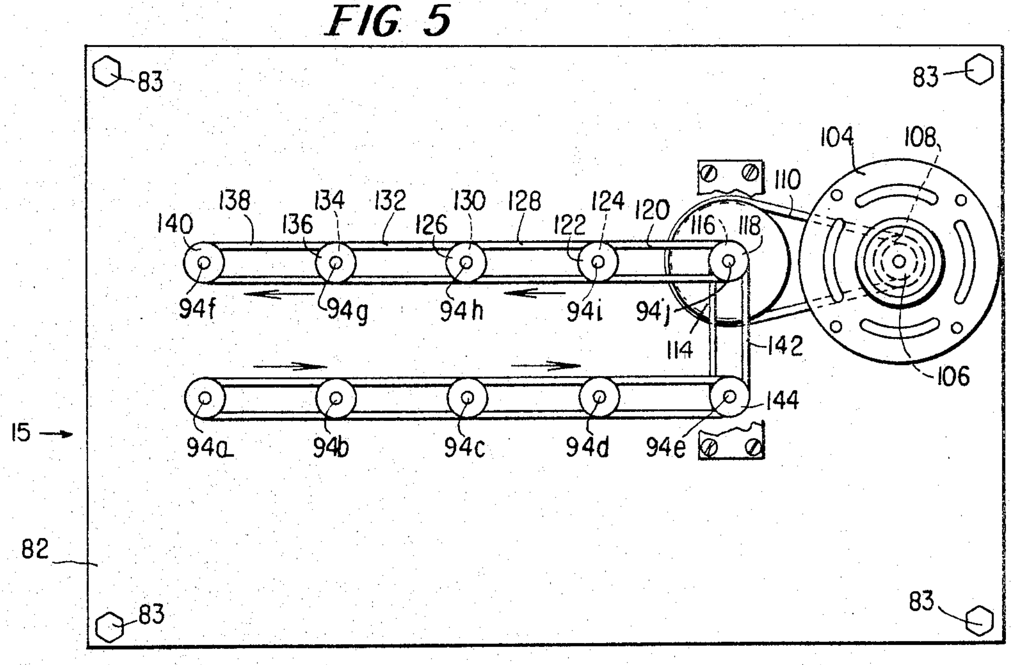
FIG. 5 is a bottom plan view of the exerciser mechanism of FIG. 3.
Figure 3:
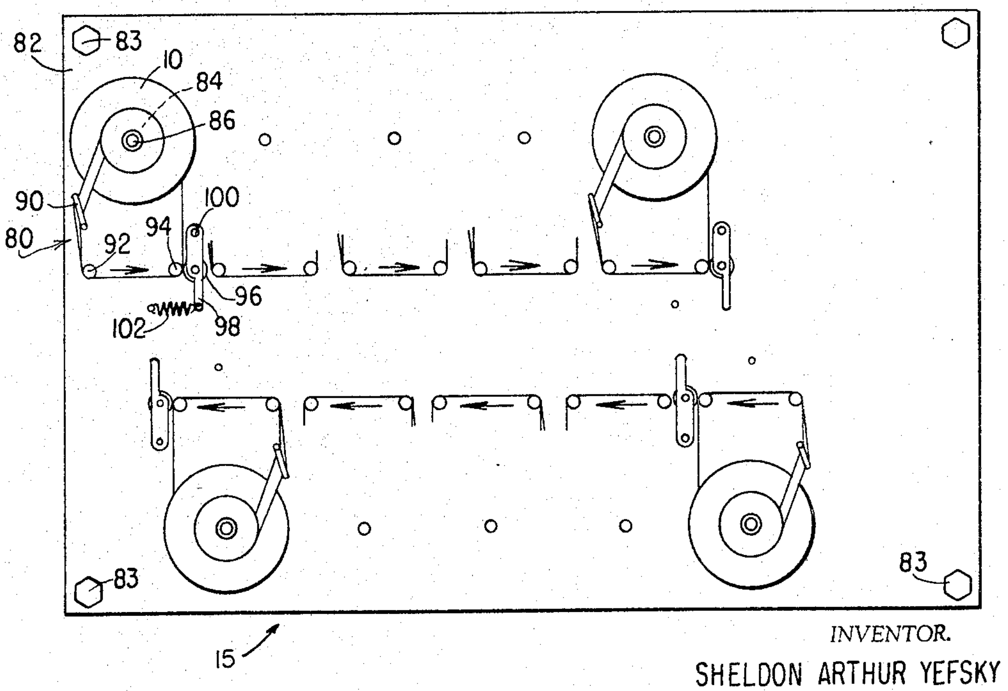
FIG. 3 is a top plan view of an exerciser mechanism embodying the principles of the present invention, used in loading the cartridge.

The mechanism 15 embodies a generally flat plate 82 which is supported from a flat surface, for example, a table, by four corner legs 83 (see FIGS. 3 and 5). The plate 82 supports each of the ten exerciser arrangements and, in addition, supports all of the driving mechanism for the exercising arrangements. Inasmuch as the construction of each of the exercising arrangements is identical, only one of these arrangements will be described. Referring now to FIG. 4, it illustrates the arrangement located at the upper left end of the upper row of the arrangements shown in FIG. 3. It embodies a support shaft 84 that specifically accommodates the central opening of the cartridge 10. The shaft 84 is suitably journaled in the plate 82 to extend upwardly to coact with the center opening of the cartridge 10. To assure that the cartridge 10 is detachably secured to the shaft 84, a suitable nut 86 is threaded onto the shaft 84.

With the cartridge 10 in position on the shaft 84, the external loop portion 80 extends in a generally downward direction, as viewed in FIGS. 3 and 4. In order to connect the loop portion 80 to the driving apparatus of the mechanism 15, it is threaded over a guide 90 comprising an inclined rod-like member that functions to maintain the tape 12 in a predetermined attitude as it is withdrawn from the inner opening 91. The loop portion 80 is then passed around a guide 92 comprising a vertically extending post that permits the loop portion 80 to make a 90° turn. Thereafter, the loop portion 80 is passed between a capstan 94*a* and idler 96, the capstan 94*a* permitting the loop portion to turn 90° to return to the cartridge through its peripheral opening 95. The capstan 94*a* and idler 96 are generally similar in construction to the previously described capstan 18 and idler 20. Actually, the capstan 94*a* is suitably journaled in the plate 82 and includes a downwardly extending portion 95*a* that is connected to the driving apparatus of the mechanism 15 and an upwardly extending portion 94*a* that drives the external loop portion 80. The idler 96 is rotatably mounted on the middle of an arm 98 that is pivoted at its end by pin 100. The end remote from the pin 100 is connected to a coil spring 102 so as to bias the idler 96 into engagement with the capstan 94*a*, thereby providing an effective driving arrangement for the loop portion 80 of the tape 12.

The above described exercising arrangements as well as the nine other exercising arrangements are drivingly connected to a driving arrangement. This driving arrangement functions to rotate each of the capstans 94 of each of the exerciser arrangements at a constant or uniform speed throughout the entire exerciser arrangement. Referring now specifically to FIGS. 5 and 6, the driving arrangement includes a constant speed synchronous motor 104 which is drivingly connected to each of the capstans 94. Hence, the speed of the capstans 94 is directed proportional to the speed at which the motor operates. More specifically, the motor 104 has a drive shaft 106 on the end of which is fixedly connected a pulley 108. A belt 110 connects the motor pulley 108 with a gear reduction pulley device 112 secured to the downward portion 95*j* of capstan 94*j*. The device 112 includes a large pulley 114 suitably secured to the portion 95*j* so as to immediately underlie the plate 82. The pulley 114 is actually driven by the belt 110 and serves to drive a pair of smaller pulleys 116 and 118 also fixedly secured to the portion 95*j* of the capstan 94*j*. As seen more clearly in FIG. 5, the capstan 94*j* is drivingly connected to the capstans 94*f*, *g*, *h* and *i* via the pulley 116 and associated belts, and is drivingly connected to the capstans 94*a*, *b*, *c*, *d*, and *e* via the pulleys 118 and associated driving belts. Thus, all of the capstans 94*a* through 94*j* are drivingly interconnected and more importantly are drivingly connected to the motor 104.

Considering now that portion of the driving arrangement that relates to capstans 94*f* through 94*j*, the small pulley 116 on the capstan 94*j* coacts with a belt 120 which engages a pulley 122 fixedly secured to the downwardly extending portion 95*i* of the capstan 94*i* (see also FIG. 6). Inasmuch as the pulleys 116 and 122 have the same diameter, the capstans 94*j* and 94*i* are driven at the same speed. Attached to the downward portion 95*i* of the capstan 94*i* is another small pulley 124 which is drivingly connected via a belt 128 to a pulley 130 fixedly secured to the downward portion 95*h* of the capstan 94*h*. Also connected to the capstan 94*h* is another small pulley 130 which is interconnected by a belt 132 to a small pulley 134 suitably secured to the downward portion 95*g* of the capstan 94*g*. The capstans 94*g* and 94*f* are interconnected by a small pulley 136 secured to the capstan 94*g*, a small pulley 140 secured to the downward portion 95*f* of capstan 94, and a belt 138 that coacts with the pulleys 134 and 140. By the above described arrangement, the capstans 94*f* and 94*j* are drivingly connected together by the belts 120, 128, 132, and 138 and, of course, their associated pulleys 118, 122, 124, 126, 130, 134, 136, and 140. Inasmuch as all of the pulleys have the same diameter, all of the capstans 94*f* through 94*j* are rotated at a constant or uniform speed as determined by the motor 104.

The capstans 94*a*, *b*, *c*, *d*, and *e* are also driven by the capstan 94*j* and, to this end, the small pulley 118 is connected by belt 142 to a small pulley 144, which is fixedly secured to the downward portion 95*e* of the capstan 94*e*. In a similar manner to that described above, capstans 95*a*, *b*, *c*, *d*, and *e* are drivingly connected together by a pulley and belt construction.

At the conclusion of the exercising period, the motor 104 is de-energized, thereby arresting the rotation of the capstans 94. At this time, the cartridges 10 are removed from the support shafts 84 and the tape is cut. Then (assuming that the pack holds about 535 feet of tape) the end adjacent the outermost convolution is grasped and the free end adjacent the innermost convolution is pulled until no more than about 9 feet of tape is removed from the pack. Actually, tape is removed until the pack tension prevents free and easy withdrawal of the tape; this occurs usually when about 9 feet have been withdrawn, but infrequently when less than 9 feet is removed. By this step, the friction between adjacent convolutions becomes substantially uniform, as does the pack radial tension. As a result, the duration of attitude insensitivity of the cartridge 10 is substantially increased. After this step, the tape is then re-spliced to form a continuous or endless loop.

Thereafter, each cartridge 10 is placed in a sensitivity jig, not shown, which simulates the actual environment in which the cartridge is to be used. The jig includes a motion driving mechanism and associated control circuit which embodies a suitable ammeter that visually indicates the motor current required to drive the tape 12 through the cartridge 10. If the motor current, as indicated by the ammeter, is outside a predetermined range, adjustment of the cartridge 10 is necessary. However, if the motor current is within a predetermined range, the tensioning arrangement embodied in the cartridge 10 is adjusted to increased the functional forces in the cartridge until the motor current is increased a predetermined amount.

Thereafter, the sensitivity jig and cartridge are operated in upside down, right side up, and intermediate positions to test the attitude insensitivity of the cartridge. Finally, a suitable adhesive, e.g., glyeptol, is applied to the tensioning arrangement of the cartridge to prevent inadvertent change or adjustment of the tensioning arrangement.

While the several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. Apparatus for loading a cartridge with a recordable medium comprising means for supplying said medium to said cartridge at a substantially constant speed, means including magnetic clutch means for rotating said cartridge at a substantially constant torque, means for supplying a current of predetermined amplitude to said magnetic clutch means so as to drive the cartridge at a predetermined torque, and circuit means for supplying a current of greater amplitude to said magnetic clutch means for a predesignated period after the loading operation is initiated.

2. Apparatus for exercising a plurality of tape cartridges individually wound with recording media having external loops of said media comprising means for supporting said cartridges, coacting capstan and idler arrangements adapted to respectively engage said external loops, prime mover means, and a pulley and belt arrangement driven by said prime mover means and drivingly connected to said capstan arrangement to drive said external loops, thereby causing the recording media to pass through the respective cartridges.

3. A method of loading a cartridge having a rotatable spool with a recordable medium; which method comprises forming a tape pack by supplying a preselected length of the medium to the cartridge spool at a substantially constant speed while rotating the medium receiving cartridge spool at a substantially constant torque; closing the ends of the medium to form a continuous loop having a portion thereof extending from the cartridge spool; and selectively advancing said portion to cause the medium to pass into, through and out of the cartridge whereby the tension in said tape pack is redistributed to simulate the tension therein during usage.

4. A method of loading a cartridge having a rotatable spool with a recordable medium; which method comprises forming a tape pack by supplying a preselected length of the medium to the cartridge spool at a substantially constant speed while rotating the medium receiving cartridge spool at a substantially constant torque so that that tension on the supplied medium decreases as the medium builds up on the cartridge spool; closing the ends of the medium to form a continuous loop having a portion thereof extending from the cartridge spool; and selectively advancing said portion to cause said medium to change its position in the cartridge and thereby readjusting the tension in the tape pack.

5. Apparatus for loading a cartridge having a rotatable spool with a recordable medium; which apparatus comprises means for supplying said medium to said cartridge spool at a substantially constant speed so as to form a tape pack thereon; means including magnetic clutch means for rotating said cartridge spool at a substantially constant torque as said medium is supplied thereto; and means for selectively controlling the energization of said clutch means to control the torque applied to the cartridge spool, said controlling means initially energizing said clutch means so as to supply a greater torque to said cartridge spool to overcome inertia at the outset of a loading operation.

6. Apparatus for loading a cartridge having a rotatable spool with a recordable medium; which apparatus comprises means for supplying said medium to said cartridge spool at a substantially constant speed so as to form a tape pack thereon; means including magnetic clutch means for rotating said cartridge spool at a substantially constant torque as said medium is supplied thereto; and current-supplying means for selectively controlling the energization of said clutch means so as to dictate the torque applied to the cartridge spool, said current-supplying means providing a greater amount of current to said magnetic clutch means at the outset of a loading operation to overcome the inertia of the loading apparatus.

References Cited by the Examiner

UNITED STATES PATENTS

| | | | |
|---|---|---|---|
| 2,658,952 | 11/1953 | Harsant et al. | 242—55.12 X |
| 3,032,285 | 5/1962 | Brede | 242—55.12 |

OTHER REFERENCES

Hi-Fi Tape Recording, vol. 4, No. 8, July 1957, New Product Report, pp. 30–32.

FRANK J. COHEN, *Primary Examiner.*

LEONARD D. CHRISTIAN, *Examiner.*